No. 641,097. Patented Jan. 9, 1900.
L. L. H. GERARD.
VARIABLE SPEED GEARING.
(Application filed Mar. 31, 1899.)
(No Model.)
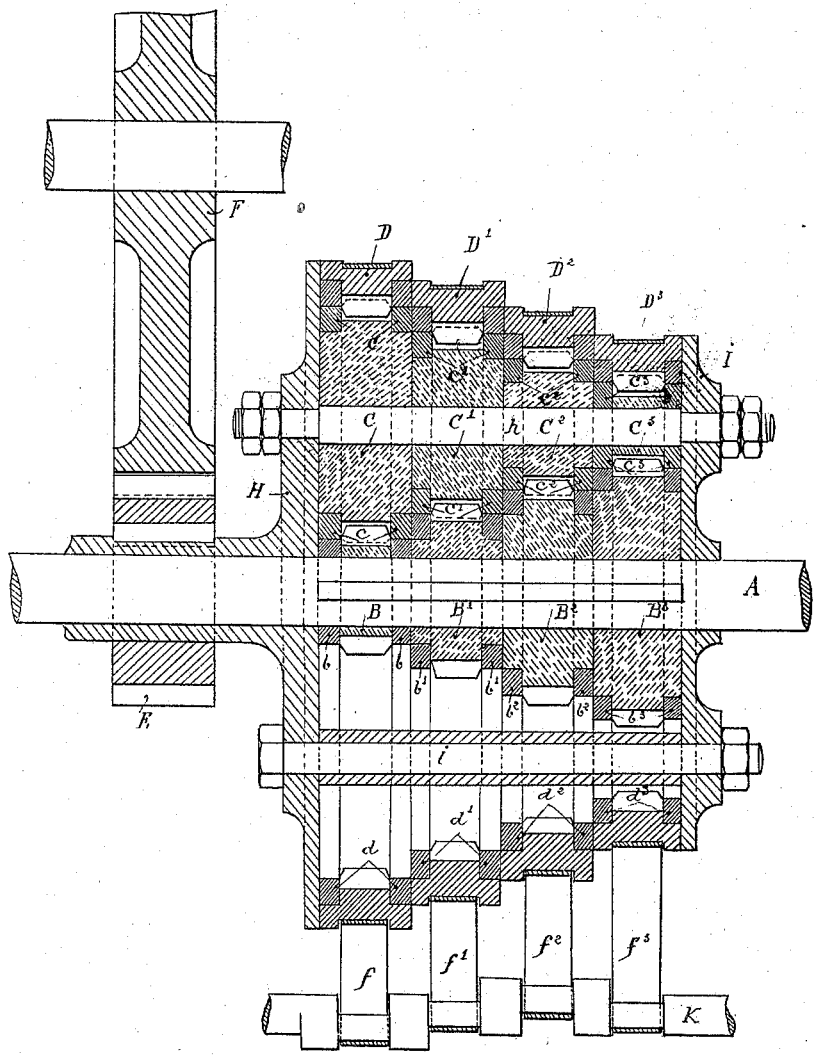

UNITED STATES PATENT OFFICE.

LOUIS LÉON HECTOR GERARD, OF PARIS, FRANCE.

VARIABLE-SPEED GEARING.

SPECIFICATION forming part of Letters Patent No. 641,097, dated January 9, 1900.

Application filed March 31, 1899. Serial No. 711,215. (No model.)

*To all whom it may concern:*

Be it known that I, LOUIS LÉON HECTOR GERARD, mechanical engineer, a citizen of the Republic of France, residing at Paris, in the Republic of France, have invented certain new and useful Improvements in Variable-Speed Gearing, (for which I have received Letters Patent in France, Patent of Addition No. 278,914, dated October 18, 1898, and in England, Provisional Patent No. 4,635, dated March 2, 1899,) of which the following is a specification.

This invention relates to improved systems of gearing by epicycloidal trains, enabling changes of speed to be obtained under very favorable conditions—that is to say, avoiding the sudden shocks which are produced in most of the systems at present employed for changing speed in cycles, motor-cycles, autocars, and other like vehicles; but it must be understood that the invention can also be applied to the changing of speeds in any kind of apparatuses or machines where it may be found useful to employ it.

The invention consists, essentially, in transmitting the movement of a given shaft having a continuous rotary motion to a second shaft parallel to the first by means of a train of epicycloidal gearing having a progressive action, the combination of several arrangements of the kind constituting a speed-changing apparatus.

In the accompanying drawing the figure is a section of a system of gearing for several speeds in which the gearings are arranged in succession one to the other.

In order to arrange in succession any suitable number of apparatuses for changing speed, I employ the feature shown, which forms an apparatus having four speeds.

Four fixed pinions B, B', B², and B³ are mounted on the same motor-shaft A side by side, and they gear with planet-pinions C C' C² C³, mounted loosely on the common shaft $h$. The internal toothed gearings D D' D² D³ are reduced to simple rings held freely between the disks H and I, which are connected by cross-bars $i$ and carry the axes $h$ of the planet-pinions. The disk H, for instance, loosely mounted on the shaft A, is prolonged by a sleeve carrying a pinion E, which transmits the movement to a toothed wheel F. Gear-wheels B B' B² B³, satellite-pinions C C' C² C³, and toothed rings D D' D² D³ are each provided laterally with free rings $b\ b'\ b^2\ b^3$, $c\ c'\ c^2\ c^3$, and $d\ d'\ d^2\ d^3$, respectively. These rings are located in grooves in the corresponding gearing, and they may, if desired, be fixed to the said gearing by screws or other suitable means of attachment. The external diameter of these rings is exactly equal to that of the primitive circumference of the gearings in such a way that said rings travel without slipping one on the other and maintain the toothed rings D D' D² D³ in place. In order to render the latter stationary, they are provided externally with grooves which receive brake-bands $f\ f'\ f^2\ f^3$, which may be actuated individually by a four-times bent shaft K, as shown in the drawing, or in any other suitable manner. In the drawing a single series of satellite-pinions C C' C² C³ are shown mounted on the same shaft $h$; but of course in practice three, four, or more sets of pinions may be employed. In the same way an arrangement for four speeds is shown; but this number may be increased or diminished in this arrangement as desired.

Motion being imparted to drive shaft A, pinions B B', &c., keyed to said shaft, will be rotated, and engaging pinions C C', &c., will tend to rotate them on their axes in opposite directions and will also tend to carry them around bodily with their sustaining-shaft $h$. This planetary movement of pinions C C', &c., is, however, resisted by pinions E and F, and the result is that pinions C C', &c., will revolve on their axis, and engaging rings D D', &c., will drive them at varying speed, according to the relative diameters of the pinions on shaft A and shaft $h$. If now one of the rings be held fixed by the brake device described, the pinion engaging said ring will be caused to travel around within the same, carrying with it the shaft $h$ and imparting motion to pinion E, which in turn will impart motion to the driven pinion F. The speed at which the driven pinion rotates under these circumstances will depend upon the relative diameters of the pinion engaging the fixed ring and that by which this pinion is driven.

It is seen, therefore, that varying speeds may be imparted to the driven pinions by holding any one of the rings D D', &c., stationary.

I declare that what I claim is—

1. In an apparatus for changing speed-gearing by epicycloidal trains, the combination of a driving-shaft A, pinions B B' $B^2$ $B^3$ of different diameters keyed on said shaft A, planet-pinions C C' $C^2$ $C^3$ loosely mounted on their axes $h$, means for supporting said axes $h$, internally-toothed wheels D D' $D^2$ $D^3$ and rings $b$ $b'$ $b^2$ $b^3$, $c$ $c'$ $c^2$ $c^3$, $d$ $d'$ $d^2$ $d^3$ of an external diameter exactly equal to that of the primitive circumference of the corresponding gearing, substantially as described and for the purpose set forth.

2. In an apparatus for changing speed-gearing by epicycloidal trains, the combination of a driving-shaft A, pinions B B' $B^2$ $B^3$ of different diameters keyed on said shaft, planet-pinions C C' $C^2$ $C^3$ loosely mounted on axes $h$, disks I loosely mounted on said shaft A and supporting the axes $h$, cross-pieces $i$ interconnecting the disks I, internally-toothed rings D D' $D^2$ $D^3$, rings $b$ $b'$ $b^2$ $b^3$, $c$ $c'$ $c^2$ $c^3$, $d$ $d'$ $d^2$ $d^3$ having an external diameter exactly equal to that of the primitive circumference of the corresponding gearing, brake-bands for rendering stationary at will one of the rings and means for operating said brake-bands, substantially as described and for the purpose set forth.

In witness whereof I have hereunto signed my name, this 11th day of March, 1899, in the presence of two subscribing witnesses.

LOUIS LÉON HECTOR GERARD.

Witnesses:
JACQUES CONDOMY,
AUGUSTE TOURNOL.